Patented July 3, 1934

1,964,734

UNITED STATES PATENT OFFICE 1,964,734

CRYSTALLINE MAGNESIUM XYLONATE AND PROCESS FOR THE PREPARATION OF MAGNESIUM SALTS OF ALDONIC ACIDS

Horace S. Isbell, Washington, D. C., assignor to the Government of the United States, represented by the Secretary of Commerce No Drawing. Application April 10, 1933, Serial No. 665,342

4 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government of the United States for governmental purposes without the payment to me of any royalty thereon.

This invention relates to the preparation of the magnesium salts of the aldonic acids from the corresponding calcium salts.

Inasmuch as the magnesium salts of the aldonic acids are commercially valuable a simple method for their preparation is desirable. Heretofore these salts have been prepared from the free acids by treatment with a magnesium base. Since the free acids are usually prepared from the calcium salts it is desirable to prepare the magnesium salts from the calcium salts rather than from the aldonic acids.

According to the present invention the preparation of the magnesium salts of the aldonic acids is accomplished by treating the corresponding calcium salts with magnesium carbonate. The magnesium carbonate causes the precipitation of insoluble calcium carbonate, which is separated, leaving a solution of the magnesium salt of the aldonic acid. The salt solution can be used as such or separated as a crystalline product.

In applying the invention the calcium salt of the desired acid is treated in aqueous solution with magnesium carbonate in the presence of carbon dioxide. The carbon dioxide causes the magnesium carbonate to pass into solution as magnesium bicarbonate, which reacts with the calcium salt forming the less soluble calcium carbonate, a part of which carbonate separates immediately while the remainder separates when the solution is warmed so as to decompose the bicarbonate. When substantially all of the calcium has been converted into calcium carbonate the insoluble calcium carbonate is removed by filtration. The magnesium salt of the sugar acid is present in the filtrate. If a crystalline product is desired it may be obtained in the usual manner by concentrating the solution to a sirup and seeding it with the crystalline substance. The magnesium carbonate used in the process need not be pure as a mixture of magnesium and calcium carbonate, such as obtained from a dolomite lime may be employed. In the event that a mixture of magnesium and calcium carbonates is used the magnesium carbonate is converted into the salt of the sugar acid while the calcium carbonate remains unchanged.

The process may be applied to the preparation of the magnesium salts of the sugar acids directly from the sugars. Thus, if a sample of glucose is electrolytically oxidized, in the presence of a bromide, and a mixture of calcium and magesium carbonates, the magnesium salt of the sugar acid is found dissolved in the electrolyte and the less soluble calcium carbonate remains undissolved. The insoluble residue is largely calcium carbonate, which may be used subsequently for the preparation of other calcium salts, such as calcium gluconate. The filtered electrolyte is evaporated to a sirup from which crystalline magnesium gluconate is separated. The mother liquor may be returned to the cell after the addition of more dextrose and magnesium carbonate and the process repeated. In the preparation of the magnesium salt it is self-evident that sufficient magnesium must be used to provide the magnesium necessary for the desired salt. That is, one equivalent for each equivalent of the sugar acid. In the event that the process is applied to the preparation of magnesium xylonate the various steps are as follows, the proportions given being approximate only and given by way of illustration.

One mole of calcium xylonate is dissolved in one liter of water and mixed with one and two tenths (1.2) moles of magnesium carbonate, while carbon dioxide is introduced into the solution, preferably with agitation. After the solution becomes acid to phenopthalein it is heated to boiling and then cooled and carbonated again until saturated with carbon dioxide; it is then again heated to boiling whereupon the calcium carbonate precipitates and is separated by filtration. The filtrate contains magnesium xylonate. The crystalline salt, magnesium xylonate, is obtained from the filtrate by evaporating it to a thick sirup and seeding. Crystalline magnesium xylonate is a new compound. When dried at 40° C. it has the following formula: $Mg(C_5H_9O_6)_2.3H_2O$. It is soluble in about three parts of water. It can be used in the dyeing and tanning industries in place of magnesium sulphate and an organic acid, in which event it is mixed with sulphuric acid. If the process is applied to the preparation of magnesium lactobionate the product is obtained in a similar manner to the one just described. The product in such case is a colorless sirup which dries to a transparent glass. The sirup has considerable body and hence it can be used as a sizing material for paper and textiles, as well as for the preparation of other products which require an amorphous binder. The examples which have been given are by way of illustration only. The process has been applied to the preparation of magnesium salts of galactonic mannonic, arabonic and maltobionic acids, as well as the acids given in the illustrations.

I claim:

1. Process for the preparation of the magnesium salts of the aldonic acids from the calcium salts by treatment of the calcium salts with magnesium carbonate in the presence of carbon dioxide, followed by the separation of the insoluble calcium carbonate from the resulting magnesium salt.

2. Process for the preparation of magnesium xylonate, which comprises treating calcium xylonate with magnesium carbonate, in the presence of carbon dioxide, and separating the resulting calcium carbonate from the solution of magnesium xylonate.

3. Process for the preparation of magnesium gluconate comprising treating calcium gluconate with magnesium carbonate in the presence of carbon dioxide, followed by the separation of the insoluble calcium carbonate from the resulting magnesium gluconate.

4. Crystalline magnesium xylonate having the formula $Mg(C_5H_9O_6)_2 \cdot 3H_2O$.

HORACE S. ISBELL.